(12) United States Patent
Neumann

(10) Patent No.: US 10,827,594 B2
(45) Date of Patent: Nov. 3, 2020

(54) ENERGY-EFFICIENT EXCHANGE OF DATA FRAMES

(71) Applicant: Inova Semiconductors GmbH, Munich (DE)

(72) Inventor: Roland Neumann, Munich (DE)

(73) Assignee: Inova Semiconductors GmbH, Munich (DE)

(*) Notice: Subject to any disclaimer, the term of this patent is extended or adjusted under 35 U.S.C. 154(b) by 0 days.

(21) Appl. No.: 16/628,965

(22) PCT Filed: Jul. 11, 2017

(86) PCT No.: PCT/EP2017/000821
§ 371 (c)(1),
(2) Date: Jan. 6, 2020

(87) PCT Pub. No.: WO2019/011392
PCT Pub. Date: Jan. 17, 2019

(65) Prior Publication Data
US 2020/0229290 A1   Jul. 16, 2020

(51) Int. Cl.
*H05B 47/18* (2020.01)
*H04L 1/00* (2006.01)
*H04L 29/08* (2006.01)

(52) U.S. Cl.
CPC .......... *H05B 47/18* (2020.01); *H04L 1/003* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 5,717,688 A | * | 2/1998 | Belanger | H04B 1/713 370/331 |
| 5,991,308 A | * | 11/1999 | Fuhrmann | H03M 13/256 370/395.53 |
| 2003/0093607 A1 | * | 5/2003 | Main | G06F 13/4045 710/306 |
| 2008/0027295 A1 | * | 1/2008 | Nakagawa | G16H 40/63 600/301 |
| 2008/0205454 A1 | | 8/2008 | Riedel et al. | |
| 2011/0046775 A1 | * | 2/2011 | Bailey | B07C 3/02 700/224 |

FOREIGN PATENT DOCUMENTS

| | | |
|---|---|---|
| DE | 102015222504 A1 | 5/2017 |
| WO | WO-2017070595 A1 | 4/2017 |
| WO | WO-2019011392 A1 | 1/2019 |

OTHER PUBLICATIONS

"International Application No. PCT/EP2017/000821, International Search Report and Written Opinion dated Sep. 27, 2017", (Sep. 27, 2017), 12 pgs.
"International Application No. PCT EP2017 000821, International Preliminary Report on Patentability (with translation) dated Jul. 10, 2019", 11 pgs.
"International Application No. PCT EP2017 000821, Article 34 amendment filed Nov. 16, 2017", 13 pgs.

* cited by examiner

*Primary Examiner* — Crystal L Hammond
(74) *Attorney, Agent, or Firm* — Schwegman Lundberg & Woessner, P.A.

(57) ABSTRACT

The present invention relates to a communication arrangement for energy-efficient exchange or transmission of data frames between a command unit and a plurality of LED control units. Further, the command unit per se and the control unit per se are proposed, as well as a communication method which operates the proposed communication arrangement. Further, the present invention relates to a computer program product comprising control commands which carry out the method or operate the communication arrangement. According to the invention, a plurality of measures is expediently combined in such a way that secure, energy-efficient exchange of data between components is possible.

14 Claims, 6 Drawing Sheets

| Downstream Frame | | | |
|---|---|---|---|
| Frame Sync | | 15 | bits |
| Freq. Sync | | 5 | bits |
| Cmd Instr | 4 | 5 | bits |
| Cmd Adr | 12 | 15 | bits |
| Cmd Data | 24 | 30 | bits |
| Cmd Crc | 8 | 10 | bits |
| Latency (30%) | | 25 | bits |
| | | 105 | bits |

Fig. 2

| Upstream Frame | | | |
|---|---|---|---|
| Frame Sync | | 15 | bits |
| Freq. Sync | | 5 | bits |
| Cmd Instr | 0 | 0 | bits |
| Cmd Adr | 12 | 15 | bits |
| Cmd Data | 12 | 15 | bits |
| Cmd Crc | 4 | 5 | bits |
| Latency (30%) | | 17 | bits |
| | | 72 | bits |

Fig. 3

| LED Update Rate (all LEDs different color) | | |
|---|---|---|
| 1 | 52,5 | us |
| 10 | 0,525 | ms |
| 100 | 5,25 | ms |
| 300 | 15,75 | ms |
| 4096 | 215,04 | ms |

| Read Duration | | |
|---|---|---|
| 1 | 36 | us |
| 10 | 0,36 | ms |
| 100 | 3,6 | ms |
| 300 | 10,8 | ms |
| 4096 | 147,456 | ms |

Fig. 4

ENERGY-EFFICIENT EXCHANGE OF DATA FRAMES

PRIORITY CLAIM TO RELATED APPLICATIONS

This application is a U.S. national stage filing under 35 U.S.C. § 371 from International Application No. PCT/EP2017/000821, filed on 11 Jul. 2017, and published as WO2019/011392 on 17 Jan. 2019, the benefit of priority of which is claimed herein, and which application and publication are hereby incorporated herein by reference in their entirety.

The present invention relates to a communication arrangement for energy-efficient exchange or transmission of data frames between a command unit and a plurality of LED control units. Further, the command unit per se and the control unit per se are proposed, as well as a communication method which operates the proposed communication arrangement. Further, the present invention relates to a computer program product comprising control commands which carry out the method or operate the communication arrangement. According to the invention, a plurality of measures is expediently combined in such a way that secure, energy-efficient exchange of data between components is possible.

WO 2017/070595 A1 shows a method for an electronic end device with several communication modes.

DE 10 2015 222 504 A1 shows a lighting apparatus for a vehicle comprising one or several processing modules as well as an internal data bus and a variety of LED units.

US 2008/0205454 A1 shows a method for transmitting serial data frames.

It is known to provide a plurality of LEDs with control units and to connect the corresponding control units in series. In this context, a command unit is provided which addresses the control units using an addressing system. Further, a data stream is generated on a communication line between the individual units, and has to be synchronised. For this purpose, it is known to provide various circuits which interpret the data flow and thereupon can subdivide the data stream into logical units. In this context, a large number of circuits have to be installed, and additionally have to be operated in an expensive manner. It is thus particularly disadvantageous that the corresponding circuits take up energy and are potentially fault-prone as a result of the large number thereof. In particular, in this context there is a high technical complexity for interpreting the data stream and for synchronising the units.

In general, series communication is known, the command unit communicating with the individual control units in such a way that either payload data or empty frames, known as IDLE frames, are transmitted. An empty frame is a predetermined bit pattern which indicates to a communication receiver that no payload data are currently being sent. Transmitting a signal of this type is complex and also fault-prone, since it is possible for bits to drop even in the empty frame, resulting in an undesired bit pattern. This method is thus fault-prone and energy-intensive, since information has to be conveyed even if no state change of an LED is supposed to occur.

For communication with communication partners, it is further known to use data frames which have individual fields. In this context, fields of a constant length are typically used, which correspond to one or more bytes. In this context, however, the coding of the corresponding data frames depends on the application scenario, and existing hardware components are typically not taken as a basis. Thus, the presence of too small a memory is sufficient to threaten the success of a communication method, but in the event of excessively large memory spaces, what is known as an overhang occurs, in such a way that some individual bits are not used.

Thus, in the prior art, it is disadvantageous that bits are wasted and in particular the fault susceptibility increases because longer data streams are more fault-prone and more complex to transmit than short data streams. Typically, predefined data frames are used which have been designed for a large number of application scenarios. However, special requirements arise specifically in the case of communication with control units for LEDs which are connected in series. For example, LEDs of this type are installed in an automobile which is electrically powered. Thus, the current uptake has a direct effect on the travel range of the vehicle and is thus of great importance.

Thus, an object of the present invention is to propose a communication arrangement for energy-efficient exchange of data frames which can particularly advantageously be installed in an automobile. Further, an object of the present invention is to propose a correspondingly set-up communication method, as well as a command unit and a control unit for use in the proposed communication method and in the proposed communication arrangement. Further, a computer program product comprising control commands which carries out the method or operates the communication arrangement is to be proposed.

The object is achieved by the features of claim 1. Further advantageous embodiments are set out in the dependent claims.

Accordingly, a communication arrangement for energy-efficient exchange of data frames between a control unit and LED control units which are coupled thereto in series is proposed, the command unit and the LED control units being set up to generate data frames as a function of a scope of a supported command set, the number of LED control units and the used parameters of minimum length, and to synchronise the communication using control commands coded unambiguously in the data frame, and further being set up to transmit no signals during ongoing operation between sending of data frames.

The proposed communication arrangement has among other things the command unit and a plurality of LED control units, which are connected in series in such a way that a single command unit is provided, to which a further LED control unit is connected. In turn, a further LED control unit is connected to this further LED control unit, resulting in a chain of components which starts with the command units, with further LED control units following. The individual components are electrically coupled, using a communication connection or a communication channel or a line, in such a way that data signals can be transmitted between the units. For this purpose, a person skilled in the art will recognise that further components are required, in particular interfaces. The proposed features are suitable in particular for use in an automobile.

By means of a communication line of this type, data frames are exchanged between the units in such a way that a data frame represents a logical sequence of signals which code bits. Thus, in the context of the present invention a data frame is a bit stream which comprises a plurality of logical units, also known as fields. Particular semantics are allocated to each of these fields. For example, a command field, an address field and a data field or parameter field may be provided. By means of these fields, the information within the proposed components can be interpreted, and corresponding commands can thus be transmitted and accepted. Exchanging data frames thus describes transmitting or sending and receiving data frames.

According to the invention, it is particularly advantageous that the data frames are generated with a minimum length. Thus, transmission is easy to implement and is additionally less fault-prone than in known methods. In this context, a supported command set, which is supported both by the command unit and by the LED control units, is used as a basis. The individual units thus implement a corresponding functionality, which can be called up using the individual commands. The command set thus comprises a set of commands which can be implemented by the command unit and/or by the LED control units. The scope of the command set thus corresponds to the cardinality of the set of commands or to the number of supported commands. For example, the corresponding portion of the data frame is a minimum if only so many bits are used that the corresponding value range actually still corresponds to the number of commands. If for example 16 commands are supported, the corresponding minimum length is initially 4 bits. Further, however, the bit sequence still has to be made unambiguous, for which reason it is advantageous to map the 4 bits to 5 bits, as is described further hereinafter. In this example, the corresponding minimum length is thus ultimately 5 bits.

The number of LED control units also places a requirement on the minimum length of the corresponding data frame. In this case too, the number of LED control units connected in series is determined again, and from this the corresponding number is coded in such a way that no excess bits are used. For example, if 15 LED control units are connected in series, 4 bits are still sufficient to implement an addressing system of the LED control units. If for example the number of LED control units is 13, 4 bits should likewise be used. However, if the number of LED control units is 20, 5 bits are to be used. Thus, all of the LED control units can be addressed using an address which is coded in the data frame, without bits being wasted unnecessarily.

In the same way, the possible parameters are determined and a field is constructed here which is exactly large enough to code the used parameters. There are thus no bits which remain empty when the corresponding field is maximally occupied.

In this context, however, there is additionally the requirement that the minimum length must not be so short that the control commands can no longer be coded unambiguously. In particular, this also applies to a plurality of data frames which are strung together. In this context, it is possible for a plurality of data frames to be strung together in such a way that the individual control commands or generally the bit sequences are no longer unambiguous. It may thus be the case that the end of a first data frame merges with the start of a second data frame in such a way that it cannot be identified which logical content is currently being coded. For this purpose, corresponding tables may be used, which map first bit sequences of a particular length to second bit sequences of a particular length in such a way that the control commands are unambiguously coded. In this way, it is thus possible to read out control commands which have a predetermined bit pattern from a bit stream. This bit pattern is unambiguous throughout the communication, in such a way that even when data frames are strung together a bit pattern of this type remains unambiguous and thus the control commands are also still always coded unambiguously.

It may thus be possible that not only does the minimum length have to take into account the corresponding required memory spaces, but rather the minimum length also has to take into account that the control commands can always be identified unambiguously in a stream. Thus, two requirements, which have to be present cumulatively, are placed on the minimum length of the data frame. First, no bits may be wasted, and second, the coded control command should remain unambiguous even when data frames are strung together.

This is implemented in that the data frames are initially determined with a preliminary minimum length, and it is subsequently determined, for example empirically, whether this minimum length is sufficient to code the control commands unambiguously. If this is not the case, the preliminary minimum length has to be adapted in such a way that the control commands are mapped to further control commands, which are typically longer than the preliminary minimum length, but are unambiguous. These tables may accordingly be calculated and prepared before the running time.

Thus, it is possible according to the invention to provide particularly efficient, and thus specifically also energy-efficient, communication, and in doing so to dispense with circuits which would be required for synchronising the data communication. This is the case because the control commands are coded unambiguously and thus a receiver can always identify a control command without separate clocking being required. This is the case because the control command is unambiguous and thus for a predetermined bit pattern the corresponding control command can always be deduced.

An additional feature according to the invention is that no signals are transmitted in ongoing operation between sending of data frames. It is thus possible to dispense with empty frames, and no energy is required. As soon as a state change of the individual components is supposed to occur or a value is supposed to be read out, a data frame comprising payload data is sent again, and the corresponding control commands can be transmitted. However, it is particularly advantageously prevented that the communication arrangement always sends bit patterns which indicate that no data transmission is taking place. This is implemented in the prior art, but without targeting the energy efficiency. Corresponding prior art methods start from a secured energy supply provided from a corresponding mains network.

According to the invention, however, it is particularly advantageous that the communication arrangement can also be used for example in an electrically powered automobile. By suppressing empty frames, in other words bit patterns which indicate that no payload data are being sent, it is achieved according to the invention that the travel range of an electrically powered car is not negatively affected.

In an aspect of the present invention, the control commands are coded unambiguously without further information, or the parameters are set up to code ambiguously coded control commands unambiguously using additional information. This has the advantage that in each case unambiguous coding of the control commands is achieved, the control commands being coded unambiguously in their own right or said control commands initially or preliminarily being coded ambiguously and additional information for unambiguous coding being provided using parameters. It is thus possible according to the invention to create a category of control commands which are not coded unambiguously among one another. For this purpose, additional information, which in cooperation with the ambiguously specified control commands unambiguously specifies said control commands, is coded in a parameter field. It is thus possible for a group of control commands to have the same bit sequence, parameters being provided for this ambiguous bit sequence and subsequently, in cooperation with the ambiguous coding, unambiguously specifying each control command. Generally, each control command is allocated a bit sequence which describes it unambiguously, in such a way that for example each control command has its unambiguous bit sequence within a numbering system. Thus, only the corresponding bit sequence has to be transmitted, and the communication receiver knows which control command is to be carried out.

In a further aspect of the present invention, the data frames are of minimum length if, for a dynamic data frame length, each bit to be transmitted codes payload data or, for a static data frame length, all possible bit occupancies of the communication arrangement can be coded without an overhang. This has the advantage that both a dynamic, in other words flexible, data frame length and a fixed data frame length can be supported. For a dynamic data frame length, only as many bits as are actually required are transmitted. For a static data frame length, the data frame length as a whole is specified once in terms of the minimum length thereof, and this fixed data frame length is always used. In this context, it is tested how many bits at most are required to specify all control commands, addresses and parameters. Thereupon, the minimum frame length is established and always used even if a data field is not fully exploited. Herein, an overhang is understood to mean at least 1 bit which is not used for the largest possible data occupancy present. Thus, the data frame comprises for example a field for instructions, a field for an address and a field for parameters. In this context, the largest control command, the largest address and the largest parameter are each selected, and subsequently determine the largest possible data frame. This data frame is established without further bits being provided. The overhang is thus prevented.

In a further aspect of the present invention, ambiguous bit occupancies are mapped to unambiguous bit occupancies of greater length using an allocation. This has the advantage that preliminarily ambiguous bit occupancies can be selected, which are based on the actually present communication arrangement. If it is subsequently found that the bit occupancies are ambiguous, these ambiguous bit occupancies can be mapped to unambiguous bit occupancies, in such a way that the minimum length of the bit occupancies takes into account both the present hardware and the requirement that the corresponding control commands have to be able to be coded unambiguously. Thus, a larger volume of bit sequences is accepted, but does create unambiguous bit sequences.

In a further aspect of the present invention, between sending of data frames there is substantially no voltage on communication channels between the command unit and the LED control units. This has the advantage that empty frames are prevented and thus no voltage or energy is used if no state change of an LED control unit is required. Thus, a current only flows if communication is actually taking place. Thus, empty frames, which would indicate to a receiver that no payload data are being transmitted, are prevented. This can be prevented according to the invention, and a particularly energy-efficient method and communication arrangement are proposed. In this context, a person skilled in the art will appreciate that "substantially" is to be understood as an optional feature, and that it is possible that undesired voltages still occur even when no voltage is actively being applied.

In a further aspect of the present invention, the data frames in a downward direction are configured differently from data frames in an upward direction. This has the advantage that the data frames can be selected as efficiently as possible as a function of the communication direction thereof, and that a data frame length in the downward direction can be thus be selected to be different from data frame length in the upward direction. Thus an optimum result is achieved as a function of direction in that the corresponding data frames can take into account the corresponding requirements.

In a further aspect of the present invention, the data frames of the upward direction are configured shorter than data frames of the downward direction. This has the advantage that the application scenario of the LEDs can be taken into account, in such a way that for example in a downward direction the colour of the LEDs can be set using an RBG code. According to the invention, this only takes place in the downward direction, and not in the upward direction. Thus, storage regions can be saved on here, and the data frame can be made more efficient, in other words shorter, than in the downward direction.

In a further aspect of the present invention, each of the control commands is coded with 4 or 5 bits. This has the advantage that each control command within this value range can be specified unambiguously, and in particular it was particularly surprisingly found that LEDs having a maximum of 16 commands can be addressed in such a way that for example functions conventional in the application scenario of an automobile can be implemented. It is therefore particularly advantageous to use 4 bits, since the entire control command set used by LED control units does not typically exceed 16 commands. If this is the case, however, parameters can also be additionally coded in. In this context, however, it is not always possible to generate unambiguous bit sequences, for which reason it is particularly advantageous according to the invention to use 5 bits. Thus, control commands which are coded with 4 bits are mapped to control commands which are coded with 5 bits. This results in an unambiguous sequence of control commands, which is still unambiguous in particular if a plurality of data frames are strung together. Thus, it is advantageous to use 5 bits in particular because in this context unambiguous data frames or unambiguous control commands can be generated, and thus in particular no bits are wasted. A minimum length of a field for control commands can thus be 5 bits.

In a further aspect of the present invention, the parameters are coded with 24 or 30 bits. This has the advantage that even long parameters such as an RGB value can be coded with the proposed length. Typically, a colour code needs 8 bits, and so three colours, for example red, green and blue, result in 24 bits. However, since in turn it is not always possible to generate an unambiguous control command or an unambiguous data frame from 24 bits which code 3 values, in turn 30 bits are used, in such a way that in turn 4 bits are mapped to 5 bits. Thus, 30 bits are particularly advantageously used in the present application scenario. 24 or 30 bits is thus the minimum length of a corresponding parameter field.

In a further aspect of the present invention, the command unit and the control units are set up to string test information for securing the transmission onto the data frame. This has the advantage that for example a CRC code, for cyclical redundancy testing, can be strung on, in such a way that it can established whether data transmission of a data frame was successful. In this context, a checksum is also generally suitable for establishing whether the data transmission was faulty. If this is the case, the data frame can be transmitted afresh.

In a further aspect of the present invention, data frames of the downward direction are made 25 percent longer than data frames of the upward direction. This has the advantage that the particularly advantageous coding of the individual fields can take place in such a way that 4 bits are always mapped to 5 bits. This results in data frames of a minimum length, which are nevertheless unambiguous.

The object is also achieved by a command unit for communication with LED control units which are coupled thereto in series, the command unit being set up to generate data frames as a function of a scope of a supported command set, the number of LED control units and the used parameters of minimum length, and to synchronise the communication using control commands coded unambiguously in the data frame, and further being set up to transmit no signals during ongoing operation between sending of data frames.

The object is further achieved by control units which can be coupled in series or an LED control unit, for communication with a command unit and with further LED control units, which is set up to generate data frames as a function of a scope of a supported command set, the number of LED control units and the used parameters of minimum length, and to synchronise the communication using control commands coded unambiguously in the data frame, and is further set up to transmit no signals during ongoing operation between sending of data frames.

The object is achieved by a communication method for energy-efficient exchange of data frames which is configured analogously to the corresponding communication arrangement.

The object is further achieved by a computer program product comprising control commands which carry out the method when they are executed on a computer or which operate the proposed communication arrangement or else operate the command unit and/or the LED control units.

According to the invention, it is particularly advantageous that the communication arrangement is set up to carry out the communication method or the communication method is set up to operate the communication arrangement. According to the invention, the proposed command unit and the proposed LED control unit may be used in the communication arrangement or these units may operate the communication method at least in part. Structural features are thus proposed which can take effect analogously as method steps. Correspondingly, method steps can be imitated using structural features.

Further advantageous embodiments are described in greater detail by way of the accompanying drawings, in which:

FIG. 2 shows an example data frame in the downward direction in accordance with an aspect of the present invention;

FIG. 3 shows an example data frame in the upward direction in accordance with an aspect of the present invention; P FIG. 4 shows measurement results which are achievable in accordance with an advantage of the present invention;

Figure 1:
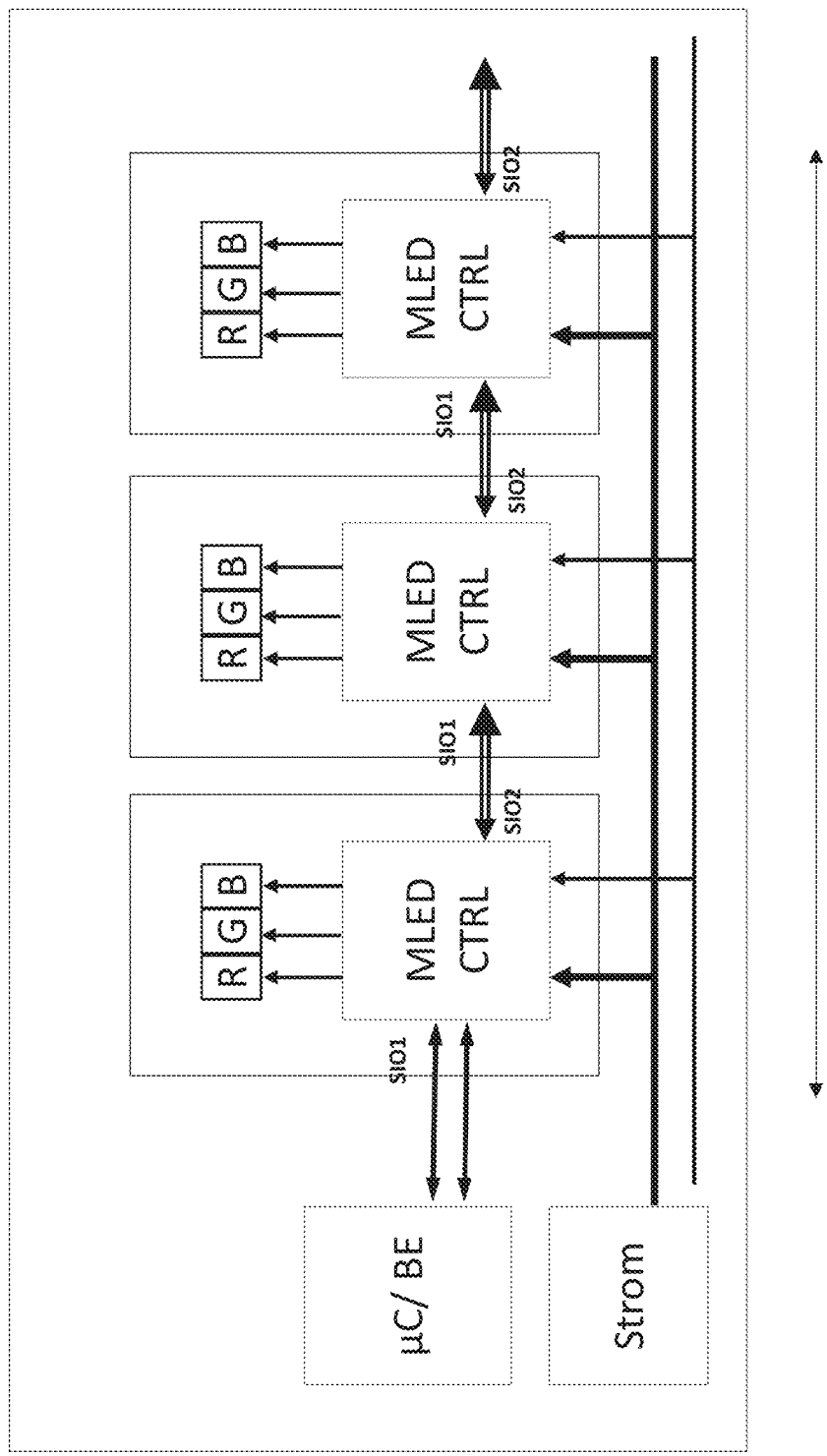
FIG. 1 shows a known application scenario as a starting point for the present invention.

FIG. 1 shows a communication arrangement such as may for example form the basis for the present invention. A communication arrangement of this type is already known, this communication arrangement being adaptable, with low technical complexity, in such a way that it corresponds to the communication arrangement according to the invention. In this context, in particular data frames are to be configured in the same way they are proposed according to the invention. It is further to be ensured that empty frames are not sent, as is proposed in conventional methods. Generally, according to the invention, further components have to be provided, but circuits for synchronising the communication can be dispensed with, since according to the invention unambiguous control commands are transmitted.

In the present FIG. 1, a microcontroller is illustrated on the left-hand side, and may be in the form of a command unit BE. On the right-hand side of the microcontroller, LED control units CTRL are connected, which actuate individual LEDs. The individual LEDs are arranged above, and may for example generate a mixing ratio of a red R, a green G and a blue B light, a particular colour tone, using individual LED units. It can also be seen in the present FIG. 1 that the control units are connected in series in such a way that a command unit is provided on the left-hand side and in addition further control units are arranged on the right-hand side of the command unit, in such a way that all of the components are connected in series. This takes place using at least one communication channel. In this context, the command unit is set up to generate corresponding data frames and pass them on to the control units. The individual control units CTRL in turn generate their own data frames or pass on the received data frames. Data frames are thus exchanged between the individual components. In this context, an exchange is based on transmitting the data frames.

Both the command unit BE and the control units CTRL support a particular command set, which for example comprises commands which instigate transmission of a colour value. Thus, the command unit may output a command that a particular colour value is to be set for a particular address, in other words a particular LED or control unit. Since the colour value is generated by mixing red, green and blue, parameters can for example be transmitted using 3 bytes, in other words 24 bits. Since these 8 bits in each case may potentially not be able to be coded unambiguously, these 8 bits in each case are mapped to 10 bits, since this results in an unambiguous bit sequence. Thus, three fields are transmitted within the data frame, namely a command field, an address field and a parameter field.

The command field may for example have a bit sequence which specifies a number of a command. Herein, this command is setting the corresponding mixing value of the LED. Further, an address field may be provided, which specifies which of the LEDs connected in series or LED are to be addressed. In this context, the control unit is always addressed directly, and subsequently sets the LED. Further, a parameter field may be provided which specifies the specific colour value.

FIG. 2 shows a corresponding frame as sent downstream. In the present invention, it is assumed, as is conventional, that the direction proceeding from the command unit BE, presently to the right, is a downward direction, and a direction proceeding from the control units CTRL towards the command unit BE is an upward direction. FIG. 1 thus has a downward direction from left to right and an upward direction from right to left. FIG. 2 thus shows a data frame which in the present FIG. 1 is being transmitted from left to right, along with example values for a minimum length of the data frame. Presently, for example 4 bits are provided for a command, 12 bits for an LED address or an address of a control unit, 24 bits for the parameters or data, and optionally 8 bits for a checksum.

However, since 4 bits cannot be coded unambiguously, according to the invention these 4 bits are expanded to 5 bits, in such a way that each bit sequence of 4 bits is assigned a bit sequence of 5 bits. According to the invention, this takes place using a table which is provided before the communication arrangement is operated. Said table may be calculated or be determined empirically.

Since according to the invention 16 control commands are sufficient, a field length of 4 bits, which is expanded to 5 bits, is proposed for this purpose. Thus, the left-hand value column is a net data rate and the right-hand value column is a gross data rate. Accordingly, 12 bits are expanded to 15 bits, 24 bits to 30 bits, and 8 bits to 10 bits. Thus, according to the invention, for 16 control commands, 4,096 control bits, 3 bytes of colour values and 8 bits of checksum, field lengths of 5, 15, 30 and 10 bits respectively are set. Added together, this results in a minimum data frame length of 60 bits. Thus, the minimum length of a data frame has been calculated for which unambiguous coding of the control commands is still possible.

In this context, it can be seen in the present table that a corresponding data frame may optionally comprise further fields which code additional information.

FIG. 3 shows a data frame which is sent in an upward direction. In this context, it is possible according to the invention to set the data frame length lower, since no colour values of the LEDs have to be transmitted. These parameter values are the longest parameter values which can be saved on in the upward direction. Likewise, no commands have to be transmitted in the upward direction, since the upward direction typically merely involves reading out status information of the LEDs. Thus, a corresponding field for control commands can be 0 bits. Thus, the checksum can also be reduced overall.

It can thus clearly be seen that according to the invention the advantage arises that for each direction the minimum data frame length can be selected, and thus efficient, low-current communication is possible overall. As a result of the short bit sequences, the proposed communication arrangement is additionally particularly fault-proof.

FIG. 4 illustrates the corresponding data rates which can be achieved according to the invention. Thus, the left-hand column shows the number of control units, the central column shows the time values, and the right-hand column shows the time unit. It is thus particularly advantageous that for example for 4,096 control units, and thus 4,096 LEDs, an update rate of 215 ms can be achieved. Accordingly, a read time of 147 ms can be achieved.

Figure 5:
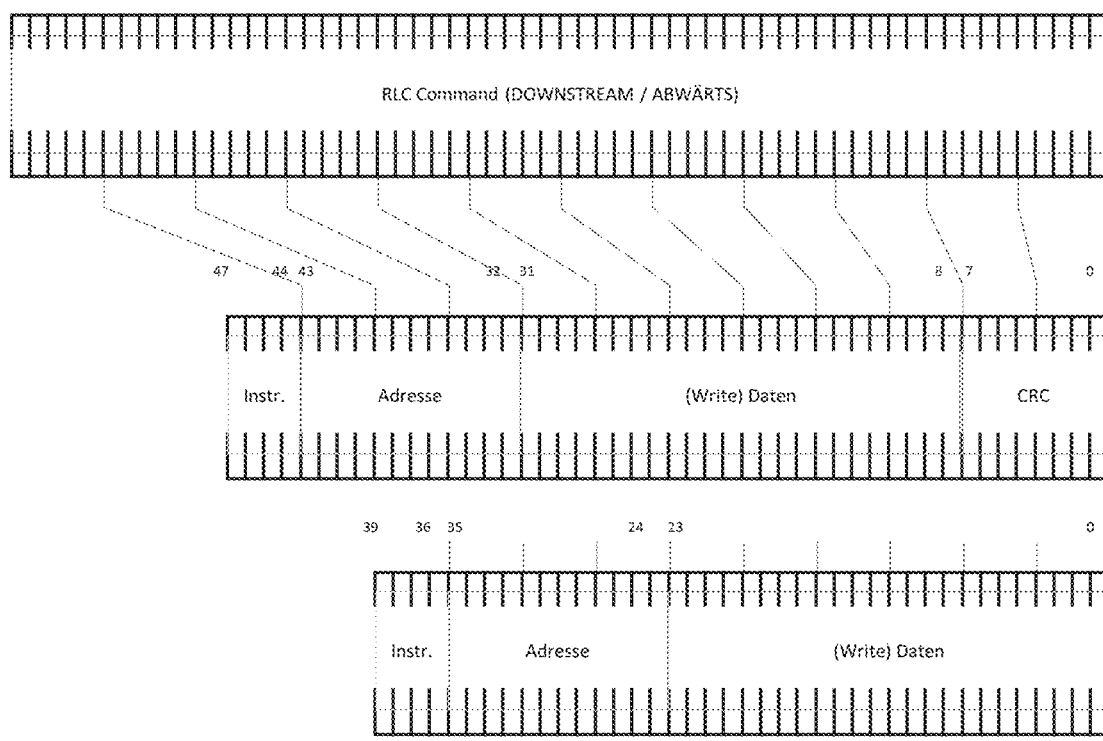
FIG. 5 shows a data frame comprising data fields in accordance with an aspect of the present invention.

FIG. 5 shows a data frame which has various data fields. According to the invention, the second row shows that a left-hand field is provided for control commands, followed to the right by an address field, followed to the right by a parameter field or data field and further a field for test information. According to the invention, it is particularly advantageous that the individual fields are each per se configured with a minimum length, in such a way that adding up the individual fields actually also results in a minimum length of the data frame as a whole. In this context, in spite of the minimum length of the bit sequences, it is possible to code the control commands unambiguously. This ensures that for successive data frames the provided information is always unambiguous. This in turn prevents hardware outlay, since synchronisation takes place using unambiguous control commands.

Figure 6:
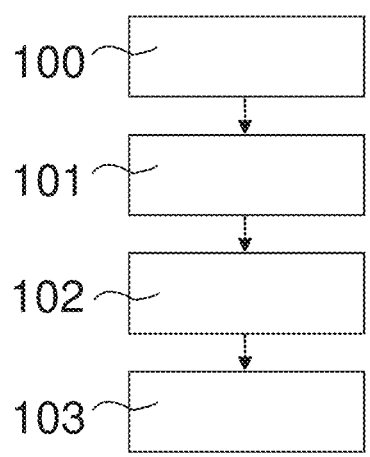
FIG. 6 is a schematic flow chart of a communication method in accordance with an aspect of the present invention.

FIG. 6 is a schematic flow chart of the communication method according to the invention for energy-efficient exchange of data frames between a command unit and LED control units which are coupled thereto in series, the command unit and the LED control units being set up to generate 100 data frames as a function of a scope of a support command set, the number of LED control units and the used parameters of minimum length, the communication being synchronised 101 using control commands coded unambiguously in the data frame, and further no signals being transmitted 103 during ongoing operation between sending 102, 104 of data frames. In this context, a person skilled in the art will appreciate that the proposed method may comprise further method steps and in particular that the individual methods steps may be carried out iteratively and/or in a different order.

The unambiguous coding relates to control commands and optionally to all further data fields. Thus, data frames are coded unambiguously as a function of a scope of a support command set, the number of LED control units and the used parameters of minimum length. Also optionally, the individual fields are coded unambiguously.

The present invention is preferably used in an electrically powered automobile. Thus, the low current uptake has a direct effect on the travel range of the vehicle, and is thus particularly advantageous.

The computer program product comprises control commands which carry out the method when they are executed on a computer or which operate the proposed communication arrangement or else operate the command unit and/or the LED control units. In this context, the computer program product may be provided in the form of a module which is for example installed in the communication arrangement. In this context, a computer is understood to mean any computation unit, in particular including an arrangement comprising a microcontroller. The communication method according to the invention can also be provided as a communication protocol which is provided on a storage medium.

The invention claimed is:

1. A communication arrangement for energy-efficient exchange of data frames between a control unit (BE) and LED control units (CTRL) coupled thereto in series,
    wherein the command unit (BE) and the LED control units (CTRL) being set up to generate data frames as a function of a scope of a supported command set, the number of LED control units (CTRL) and the used parameters of minimum length, and to synchronise the communication using control commands coded unambiguously in the data frame, and further being set up to transmit no signals during ongoing operation between sending of data frames,
    wherein the data frames are of minimum length if, for a dynamic data frame length, each bit to be transmitted codes payload data or, for a static data frame length, all possible bit occupancies of the communication arrangement can be coded without an overhang.

2. The communication arrangement according to claim 1, wherein the control commands are coded unambiguously without further information, or the parameters are set up to code ambiguously coded control commands unambiguously using additional information.

3. The communication arrangement according to claim 1, wherein ambiguous bit occupancies are mapped to unambiguous bit occupancies of greater length using an allocation.

4. The communication arrangement according to claim 1, wherein between sending of data frames there is substantially no voltage on communication channels between the command unit (BE) and the LED control units (CTRL).

5. The communication arrangement according to claim 1, wherein the data frames in a downward direction are configured differently from data frames in an upward direction.

6. The communication arrangement according to claim 1, wherein the data frames of the upward direction are configured shorter than data frames of the downward direction.

7. The communication arrangement according to claim 1, wherein each of the control commands is coded with 4 or 5 bits.

8. The communication arrangement according to claim 1, wherein the parameters are coded with 24 or 30 bits.

9. The communication arrangement according to claim 1, wherein the command unit (BE) and the control units (CTRL) are set up to string test information for securing the transmission onto the data frame.

10. The communication arrangement according to claim 1, wherein data frames of the downward direction are made 25 percent longer than data frames of the upward direction.

11. A command unit (BE) for communication with LED control units (CTRL) coupled thereto in series,
wherein the command unit (BE) being set up to generate data frames as a function of a scope of a supported command set, the number of LED control units (CTRL) and the used parameters of minimum length, and to synchronise the communication using control commands coded unambiguously in the data frame, and further being set up to transmit no signals during ongoing operation between sending of data frames,
wherein the data frames are of minimum length if, for a dynamic data frame length, each bit to be transmitted codes payload data or, for a static data frame length, all possible bit occupancies of the communication arrangement can be coded without an overhang.

12. An LED control unit, which can be coupled in series for communication with a command unit (BE) and with further LED control units (CTRL), which is set up to generate data frames as a function of a scope of a supported command set, the number of LED control units (CTRL) and the used parameters of minimum length, and to synchronise the communication using control commands coded unambiguously in the data frame, and is further set up to transmit no signals during ongoing operation between sending of data frames,
wherein the data frames are of minimum length if, for a dynamic frame length, each bit to be transmitted codes payload data or, for a static data frame length, all possible bit occupancies of the communication arrangement can be coded without an overhang.

13. A communication method for energy-efficient exchange of data frames between a control unit (BE) and LED control units (CTRL) coupled thereto in series,
wherein the command unit (BE) and the LED control units (CTRL) being set up to generate (100) data frames as a function of a scope of a supported command set, the number of LED control units (CTRL) and the used parameters of minimum length, the communication being synchronised (101) using control commands coded unambiguously in the data frame, and further no signals being transmitted (103) during ongoing operation between sending (102, 104) of data frames,
wherein the data frames are of minimum length if, for a dynamic frame length, each bit to be transmitted codes payload data or, for a static data frame length, all possible bit occupancies of the communication arrangement can be coded without an overhang.

14. A computer program product comprising control commands which carry out the method according to claim 13 when they are executed on a computer.

* * * * *